United States Patent Office 2,697,725
Patented Dec. 21, 1954

2,697,725

RECOVERY OF ORGANIC ACIDS FROM AQUEOUS SOLUTIONS

Hugh G. Bryce, near Hudson, Wis., assignor to The Sharples Corporation, a corporation of Delaware No Drawing. Application March 18, 1950, Serial No. 150,548

13 Claims. (Cl. 260—527)

This invention relates to a process for recovering organic acids from solutions containing mixtures of organic acid anions and mineral acid anions by means of ion exchange materials. More specifically, the invention relates to treating such solutions with ion exchange materials to recover the organic anions, or to remove undesirable organic anions from the solution.

My invention is adapted for recovering organic acids from blackstrap molasses, beet molasses, distiller's slop, sorgo juices, pineapple and citrus juices and extracts, apple juice, grape juice and other fruit, vegetable and plant juices containing organic acids. Such materials are treated with a suitable anion exchange material to separate the organic acid anion. The exchange material is then suitably treated to recover the organic acid anion.

More particularly my invention is adapted for the recovery of aconitic acid by ion-exchange from blackstrap molasses in which the aconitic acid may be present in amounts up to about 5% by weight on Brix solids. Blackstrap molasses is the by-product of raw sugar manufacture. It is a heavy viscous liquid separated from the final low grade massecuite from which no further sugar can be profitably crystallized by the usual methods. The density of blackstrap molasses ranges from 85° to 92° Brix, containing total solids by drying of 77 to 84%. The sucrose varies by weight between 25 and 40% and the reducing sugars from 30 to 12% with total sugars about 50%. Normal blackstrap molasses has a pH of about 5 to 6. It contains anywhere from 0.5 to 5% in Brix of aconitic acid and small amounts of other organic acids such as succinic acid and oxalic acid, and also substantial amounts of mineral salts such as the chlorides, sulfates and phosphates of potassium, calcium, magnesium and sodium.

The following examples are specific embodiments of my invention relating to the treatment of molasses and of solutions containing a mixture of citrate and sulfate ions. However, it is to be understood that my invention is not restricted by the specific embodiments of my invention herein disclosed and is capable of application to the recovery of organic acids from various solutions in which they may be present such as those previously mentioned.

EXAMPLE 1

2500 g. of diluted blackstrap molasses having a density of 37.4° Brix and containing 2.22% aconitic acid by weight of solids was treated with 78.3 g. (dry weight) of a base regenerated aliphatic amine phenol-formaldehyde anion exchange resin (Ionac A-300, sold by American Cyanamid Company, New York, N. Y.), and 28 ml. of concentrated HCl at room temperature and stirred for one hour. The mixture had a final pH of 5.8. The resin was then centrifuged from the molasses and washed. The washed resin was treated with two portions of 5% aqueous ammonia solution of 250 ml. each. A recovery of 5.7 g. of aconitic acid was made.

EXAMPLE 2

250 ml. of an aqueous solution containing 50 ml. of 1 N H$_2$SO$_4$, 130.5 ml. 1 N NaOH and 9.60 g. citric acid monohydrate was thoroughly mixed and agitated with 10 g. of a moist (44% H$_2$O) alkali regenerated aliphatic amine phenol-formaldehyde anion exchange resin (Ionac A-300) until the final pH was 5.1. The mixture was filtered and the resin separated. The resin removed 1.75 g. citric acid and 0.41 g. H$_2$SO$_4$ from the solution.

EXAMPLE 3

700 g. of diluted blackstrap molasses having a density of 39° Brix was treated with 49.7 g. of a nuclear sulfonic acid type cation exchange resin in the hydrogen form (Nalcite HCR, sold by National Aluminate Company, Chicago, Illinois), and 24.9 g. of a base regenerated aliphatic amine phenol-formaldehyde type anion exchange resin (Ionac A-300) by stirring together for ½ hour at room temperature. The final pH of the mixture was 4.6. The resins were then separated from the molasses and then from each other for regeneration. The anion exchange resin was first treated with sulfuric acid at a pH close to zero and the resultant solution separated from the resin. 3.88 g. of aconitic acid was present from this solution. This resin was then regenerated with 1.5 N sodium hydroxide prior to reuse with another sample of the molasses. The cation exchange resin was regenerated with 2 N sulfuric acid.

EXAMPLE 4

700 g. of diluted blackstrap molasses having a density of 51.3° Brix was thoroughly mixed and agitated with 6.7% by weight of 100–200 mesh alkali regenerated aliphatic amine phenol-formaldehyde resin (Ionac A-300). This diluted molasses contained aconitate, sulfate, and chloride anions in the following amounts, expressed as weights of their free acids: aconitate 0.78%, sulfate 0.41%, chloride 0.94%. Before this resin was mixed with the molasses it was first treated with a solution of H$_2$SO$_4$ to have a final pH of 1 and then treated with ammonia to have a final pH of 3.1. The treated resin was mixed and stirred with the molasses for 20 minutes until the final pH of the mixture was 4.1. The resin was then centrifuged from the molasses, thereby lowering the aconitic acid concentration of the original molasses by 65%.

EXAMPLE 5

Four 700 g. samples of diluted blackstrap molasses having a density of 51° Brix were each intimately mixed and stirred with 59 g. (as dry alkali regenerated anion exchanger) of an aliphatic amine phenol-formaldehyde resin (Ionac A-300) containing 65% by weight of adsorbed sulfuric acid based on the dry alkali regenerated anion exchanger. The particle size of the exchange resin was −60+100 mesh. Samples 1, 2, 3 and 4 were treated with 10, 14, 17 and 21 grams of calcium hydroxide, respectively, to adjust the pH. The mixtures were each stirred for 5½ hours at room temperature. The final pH of each of the mixtures, that is of the treated molasses samples in contact with the exchanger, was measured to be 3.7, 4.3, 5.0 and 6.2 for samples 1, 2, 3 and 4, respectively. The anion exchange resin was then separated from the mixture by centrifugation. The exchange resin recovered from each sample was washed by slurrying in 600 milliliters of tap water, decanting, and repeating the procedure for a total of three times.

Each of the samples of washed exchange resin was slurried in 150 milliliters of tap water, and sufficient 5.8 N sulfuric acid was added to each to bring the pH of the slurry to 0.5. The slurries were stirred for 15 minutes and then filtered. 100 milliliters of water was used to wash each of the samples of the exchanger. The total filtrates resulting from treating samples 1, 2, 3 and 4 were found to contain 0.9, 2.9, 3.5 and 2.2 grams of aconitic acid, respectively. These results are summarized in the following Table I.

*Table I*

| Sample No. | 1 | 2 | 3 | 4 |
|---|---|---|---|---|
| Final pH of treated molasses | 3.7 | 4.3 | 5.0 | 6.2 |
| Grams of aconitic acid recovered | 0.9 | 2.9 | 3.5 | 2.2 |

EXAMPLE 6

Four 250 ml. aqueous solutions each containing 50 ml. of 1 N H$_2$SO$_4$ and 3.75 g. of tartaric acid were each thoroughly mixed and agitated with 10 g. of a moist (44% H₂O) alkali regenerated aliphatic amine phenol-formaldehyde anion exchange resin (Ionac A–300). To the solutions 1, 2, 3, 4 had been added, respectively, 0.0, 1.18, 2.36 and 3.57 g. of NaOH. The solutions were all stirred until no further change in pH occurred, and at this time the pH's of the four mixtures were respectively: 1.5, 2.9, 4.1, and 7.7. The resins were centrifuged from the solutions, and, by analysis, the following amounts of acids were removed from the solutions by the resins:

| Solution Number | 1 | 2 | 3 | 4 |
|---|---|---|---|---|
| Final pH | 1.5 | 2.9 | 4.1 | 7.7 |
| Tartaric Acid removed (g.) | 0.08 | 0.37 | 0.62 | 0.19 |
| Sulfuric Acid removed (g.) | 2.32 | 1.85 | 1.23 | 0.39 |

EXAMPLE 7

Two 250 ml. aqueous solutions each containing 50 ml. of 1 N $N_2HO_4$ and 28.8 ml. glacial acetic acid were each thoroughly mixed and agitated with 10 g. of a moist (44% H₂O) alkali regenerated aliphatic amine phenol-formaldehyde anion exchange resin (Ionac A–300). To solutions 1 and 2 had been added, respectively, 0.0 and 5.15 g. NaOH. The solutions were all stirred until no further change in pH occurred; and, at this time, the pH of the two mixtures were, respectively: 1.6 and 4.0. The resins were removed from the solutions by filtration; and, by analysis, the following amounts of acids were removed from the solutions by the resins:

| Solution Number | 1 | 2 |
|---|---|---|
| Final pH | 1.6 | 4.0 |
| Acetic acid removed (g.) | 1.2 | 1.3 |
| Sulfuric acid removed (g.) | 2.4 | 1.5 |

EXAMPLE 8

250 ml. aqueous solution containing 50 ml. of 1 N sulfuric acid and 3.25 g. itaconic acid was thoroughly mixed and agitated with 6.35 g. of a moist (12% H₂O) alkali regenerated aliphatic amine phenol-formaldehyde anion exchange resin (Ionac A–300). To this solution had been added 2.38 g. of NaOH. The solution was stirred until no further change in pH occurred; and, at this time, the pH of the mixture was 6.0. The resin was removed from the solution by filtration; and, by analysis, the following amounts of acids were removed from the solution by the resin:

Final pH ---------------------------------- 6.0
Itaconic acid removed (g.) ---------------- 0.7
Sulfuric acid removed (g.) ---------------- 1.3

An important feature of my invention relates to the control of the conditions for the efficient selective adsorption of the organic acid desired to be recovered by an anionic exchange material and the regeneration of the anionic exchange material so that it may be reused. I have discovered that when an anion exchange resin is intimately mixed with a solution containing organic and mineral acid anions, such as sulfate and aconitate, that the maximum adsorption of the organic anion occurs when the final pH of the solution in contact with the anion exchange resin is maintained within the range between about 4 to about 6, such as, between 4.5 and 5.5. In this pH range, the ratio of organic anion to inorganic anions adsorbed on the resin compared to that ratio in the solution is greater than at lower pH's and at pH's above this range the capacity of the resin for all anions (other than hydroxyl) becomes relatively small. If the exchange resin is separated from the solution and then is treated with a solution of a mineral acid at a pH not over 2 the organic acid anions adsorbed thereon go largely into solution, from which they can be suitably recovered. The exchange resin, containing adsorbed mineral acid can then be reused in another cycle to adsorb additional organic acid anions.

Therefore, I have found in the case of certain organic acids such as aconitic and citric admixed with inorganic acids, such as, sulfuric or hydrochloric acids, that the ratio of organic to inorganic anion on the resin is actually greater than in the solution when the adsorption is carried out in the pH range of 4 to 6. This is a striking result, when one considers the relative strengths of the acids concerned and the generally accepted theory in the art that the stronger acids will displace the weaker ones from the resin.

However, even in the case where the ratio of organic to inorganic anions adsorbed on the resin is not greater than in the solutions, I have found, as shown in Example 6 in the case of mixtures of tartaric and sulfuric acids, that the maximum adsorption of organic acid anion occurs in my pH range. Therefore, if I am only interested in removing the organic acid anion from the material in which it is found admixed with inorganic acid anions, I have found that I can do this with the most efficient use of resin (i. e. remove the largest quantity of organic anion per unit weight of resin) by carrying out the adsorption with conditions adjusted so that the pH of the mixture is in the range of 4 to 6 during the adsorption.

I may separate aconitic acid in accordance with my invention from various molasses products, distillery slop resulting from cane molasses fermentation, sorgo juices and the like. I may also separate various organic acids from a wide variety of fruit, vegetable and plant juices and extracts. I may, for example, separate itaconic acid from beet molasses, citric acid from pineapple and citrus fruit juice and wastes, tartaric acid from grape juice and wastes, malic acid from apple juice and wastes, oxalic and other acids from plant extracts and the like. My invention is thus suitable for recovering various organic acids which are soluble in water in either low or high concentrations, such as the saturated monobasic aliphatic acids of which the following are typical examples: acetic acid, formic acid, and butyric acid; saturated aliphatic dibasic acids of which the following are typical examples: oxalic acid, succinic acid, and glutaric acid; saturated aliphatic tribasic acids such as tricarballylic acid; unsaturated aliphatic acids of which the following are typical: acrylic acid, maleic acid, and aconitic acid; aromatic acids of which the following are typical: phthalic acid, and benzoic acid; derivatives of such acids, of which the following are typical: malic acid, itaconic acid, citric acid, glutamic acid, tartaric acid, and trichloroacetic acid.

The separation of organic acid from solutions thereof, such as for example aconitic acid from molasses, may be effected by means of any suitable anionic exchange materials. I prefer to use various commercially available organic synthetic resins, such as Ionac A–300, previously mentioned; Amberlite–1R4B, sold by The Rohm and Haas Company, Philadelphia, Pa., which is an amine phenol-formaldehyde resin; Duolite A–3, sold by Chemical Process Company, San Francisco, California, which is an aliphatic amine phenol-formaldehyde resin; Nalcite A–1 and A–2, sold by National Aluminate Company, Chicago, Illinois, and Amberlite-1RA–400, sold by The Rohm and Haas Company, which are hydrocarbon polymers containing quaternary nitrogen atoms. The specific resin used in practicing my invention depends on its stability under the operating conditions used and the number of cycles in which it can be continuously used and reactivated. Ionac A–300, for example, essentially maintains its adsorptive capacity through 60 cycles.

The regeneration of the exchange resin may be carried out if desired with other acids such as hydrochloric acid or phosphoric acid. When an acid regenerated exchanger is used, lime or other alkaline materials may be used to adjust the pH of the liquor during the adsorption step, if necessary. The exchange resin may also be regenerated by treating with lime or caustic soda, ammonia, soda ash or other alkaline materials so as to yield a base regenerated exchange resin. In such case sulfuric or other mineral acids or an acid regenerated cation resin may be added to the system instead of lime or other alkaline material to maintain the pH of the liquor within the desired pH range during the adsorption step, if necessary. I may also use a mixture of a base regenerated anion exchange resin and an acid regenerated anion exchange resin so that the final pH of the treated solution ranges from about 4 to about 6 without requiring the addition of further acid or alkali to the mixture. As illustrated in Example 4, the exchange resin may be pretreated with acid or alkali depending whether it is a base regenerated or acid regenerated resin so that when such pretreated exchange resin is used the final pH of the liquor treated will be maintained within my preferred range. Also as illustrated in Example 3, I may admix a suitable cation exchange material in such proportions as to maintain the pH of the treated solution between about 4 to about 6.

Other modifications within the scope of the invention will be apparent to those who are skilled in the art which are intended to be included within the scope of the appended claims.

I claim:

1. In a process for recovering organic acid anions from an aqueous solution containing mineral acid anions and anions of an organic acid of the group consisting of acetic acid, formic acid, butyric acid, oxalic acid, succinic acid, glutaric acid, tricarballylic acid, acrylic acid, maleic acid, aconitic acid, phthalic acid, benzoic acid, malic acid, itaconic acid, citric acid, glutamic acid, tartaric acid, and trichloroacetic acid, the steps which comprise mixing with said solution an anionic exchange material, and bringing the pH throughout the solution in contact with said anionic exchange material within the range of from 4 to 6 to adsorb organic acid anions on said anionic exchange material.

2. The process of claim 1, wherein the anionic exchange material is base regenerated, and wherein the pH of the mixture is brought within the range of from 4 to 6 by the addition to said mixture of a mineral acid.

3. The process of claim 1, wherein the anionic exchange material is acid regenerated, and wherein the pH of the mixture is brought within the range of from 4 to 6 by the addition to said mixture of an alkaline material.

4. The process of claim 1, wherein acid regenerated anionic exchange material and base regenerated anionic exchange material are mixed with the solution in relative amounts such that the pH of the mixture falls within the range of from 4 to 6.

5. The process of claim 1, wherein anionic exchange material and cationic exchange material are admixed with the solution in relative amounts such that the pH of the mixture falls within the range of from 4 to 6.

6. The process of claim 1, wherein the aqueous solution is derived from a plant.

7. The process of recovering aconitic acid from an aqueous solution containing aconitate anions and sulfate anions which comprises mixing said solution with an anionic exchange material, adjusting the pH of the solution in contact with said anionic exchange material to between about 4 and about 6 to adsorb aconitic acid anions thereon, separating the exchange material from the solution, and treating same to liberate aconitic acid anions.

8. The process of recovering aconitic acid from an aqueous solution containing aconitate anions and sulfate anions which comprises mixing said solution with an anionic exchange material, adjusting the pH of the solution in contact with said anionic exchange material to about 5 to adsorb aconitic acid anions thereon, separating the exchange material from the solution, and treating same to liberate aconitic acid anions.

9. The process of recovering aconitic acid from molasses liquor containing mineral acid anions and aconitic acid anions which comprises mixing said liquor with an anionic exchange material, adjusting the pH of the liquor in contact with said anionic exchange material to between about 4 and about 6 to adsorb aconitic acid anions, separating the exchange material from said liquor, and treating same to liberate aconitic acid anions from the anionic exchange material.

10. The process of recovering organic acid anions from an aqueous solution derived from fruit and containing mineral acid anions and organic acid anions which comprises mixing said solution with an anionic exchange material, adjusting the pH of the solution in contact with said anionic exchange material to between about 4 and about 6 to adsorb organic acid anions, separating the exchange material from said solution, and treating same to liberate organic acid anions from the anionic exchange material.

11. The process of recovering citric acid anions from an aqueous solution derived from citrus fruit and containing mineral acid anions and citric acid anions which comprises mixing said solution with an anionic exchange material, adjusting the pH of the solution in contact with said anionic exchange material to between about 4 and about 6 to adsorb citric acid anions, separating the exchange material from said solution, and treating same to liberate citric acid anions from the anionic exchange material.

12. The process of recovering tartaric acid anions from an aqueous solution containing mineral acid anions and tartaric acid anions which comprises mixing said solution with an anionic exchange material, adjusting the pH of the solution in contact with said anionic exchange material to between about 4 and about 6 to adsorb tartaric acid anions, separating the exchange material from said solution, and treating same to liberate tartaric acid anions from the anionic exchange material.

13. The process of recovering aconitic acid anions from molasses liquor containing sulfuric acid anions and aconitic acid anions which comprises mixing said liquor with a sulfuric acid regenerated anionic exchange material, adding lime to the mixture to adjust the pH of the liquor in contact with said anionic exchange material to between about 4 and about 6 to adsorb aconitic acid anions on said exchange material, separating the exchange material from said liquor and treating same with an aqueous mineral acid solution having a pH not exceeding 2 to liberate aconitic acid anions from the anionic exchange material.

References Cited in the file of this patent

UNITED STATES PATENTS

| Number | Name | Date |
|---|---|---|
| 2,341,907 | Cheetham et al. | Feb. 15, 1944 |
| 2,386,926 | Block | Oct. 16, 1945 |
| 2,388,195 | Vallez | Oct. 30, 1945 |
| 2,415,558 | Hesler et al. | Feb. 11, 1947 |
| 2,457,117 | Bernardi | Dec. 28, 1948 |
| 2,470,500 | Lawrence | May 17, 1949 |

FOREIGN PATENTS

| Number | Country | Date |
|---|---|---|
| 805,092 | France | Nov. 10, 1936 |
| 543,212 | Great Britain | Dec. 23, 1941 |
| 941,968 | France | Sept. 6, 1948 |

OTHER REFERENCES

Myers et al.: Ind. and Eng. Chem., vol. 33, pages 697–706 (1941).

"Information Sheet on Recovery of Tartrates from Grape Wastes," AIC–14, Western Reg. Research Lab., Bureau of Agri. and Ind. Chem., U. S. Dept. of Agri., August 1943.

Englis et al.: Ind. and Eng. Chem., vol. 36, pp. 605–609 (1944).

Matchett et al.: Ind. and Eng. Chem., vol. 36, p. 851 (1941).

Buck et al.: Ind. and Eng. Chem., vol. 39, pp. 1087–9 (1947).

Nachod: Ion Exchange (Academic Press), p. 306 (1949).

Winters et al.: Ind. and Eng. Chem., vol. 41, pp. 460–3 (1949).